(12) United States Patent
Kistner et al.

(10) Patent No.: US 9,447,919 B2
(45) Date of Patent: Sep. 20, 2016

(54) OIL SLINGER MOUNTING ARRANGEMENT

(71) Applicant: GHH RAND SCHRAUBENKOMPRESSOREN GMBH, Oberhausen (DE)

(72) Inventors: Daniel Kistner, Munster (DE); Frank Banaszak, Recklinghausen (DE)

(73) Assignee: Ingersoll-Rand International Limited (Ireland), Swords (IE)

( * ) Notice: Subject to any disclaimer, the term of this patent is extended or adjusted under 35 U.S.C. 154(b) by 216 days.

(21) Appl. No.: 14/027,179

(22) Filed: Sep. 14, 2013

(65) Prior Publication Data

US 2014/0076663 A1    Mar. 20, 2014

Related U.S. Application Data

(60) Provisional application No. 61/701,229, filed on Sep. 14, 2012.

(51) Int. Cl.
| F16N 7/26 | (2006.01) |
| F16N 7/18 | (2006.01) |
| F16D 1/09 | (2006.01) |
| F16D 1/092 | (2006.01) |

(52) U.S. Cl.
CPC .. *F16N 7/26* (2013.01); *F16D 1/09* (2013.01); *F16D 1/092* (2013.01); *F16N 7/18* (2013.01)

(58) Field of Classification Search
CPC ............... F16N 7/16; F16N 7/26; F16D 1/09; F16D 1/092
USPC .......... 184/11.1, 13.1; 384/472, 538; 403/367
See application file for complete search history.

(56) References Cited

U.S. PATENT DOCUMENTS

| 1,116,845 | A | * | 11/1914 | Rogers .......................... 384/538 |
| 2,438,866 | A | * | 3/1948  | Rockwel et al. .......... 416/244 R |
| 3,301,614 | A | * | 1/1967  | Haentjens ..................... 384/472 |
| 3,501,183 | A | * | 3/1970  | Stratienko ..................... 403/370 |
| 3,596,943 | A | * | 8/1971  | Krauss ........................... 403/370 |
| 3,687,233 | A |   | 8/1972  | Greenwald |
| 4,171,137 | A |   | 10/1979 | Aizu et al. |
| 4,200,614 | A | * | 4/1980  | Colburn .................. B01J 19/18 366/307 |
| 4,268,185 | A | * | 5/1981  | Mullenberg ..................... 403/16 |
| 4,392,752 | A |   | 7/1983  | Shimizu et al. |
| 4,596,477 | A | * | 6/1986  | Lundgren ..................... 384/538 |
| 4,798,523 | A |   | 1/1989  | Glaser et al. |

(Continued)

FOREIGN PATENT DOCUMENTS

| GB | 117015  | 7/1918 |
| GB | 558740  | 1/1944 |

OTHER PUBLICATIONS

International Search Report and Written Opinion; International PCT Application No. PCT/US2013/059839; Feb. 18, 2014; 5 pages.

*Primary Examiner* — Minh Truong
(74) *Attorney, Agent, or Firm* — Taft Stettinius & Hollister LLP

(57) ABSTRACT

An oil slinger for a blower is provided. The oil slinger provides many unique features including, but not limited to, being removably mounted to a rotatably mounted shaft. Such removable mounting can be accomplished through use of an adapter sleeve mounted over a shaft, a slinger hub onto which is mounted an oil slinger, and a lock nut with retaining element. In one form the adapter sleeve includes a outer frustoconical surface which engages an inner frustoconical surface of the slinger hub.

17 Claims, 2 Drawing Sheets

(56) References Cited

U.S. PATENT DOCUMENTS

| | | | |
|---|---|---|---|
| 5,591,020 A | 1/1997 | Rockwood | |
| 5,636,848 A | 6/1997 | Hager et al. | |
| 5,647,735 A * | 7/1997 | Rockwood | 417/423.13 |
| 5,876,127 A * | 3/1999 | Casey | 384/538 |
| 6,200,037 B1 | 3/2001 | Braun | |
| 6,439,208 B1 | 8/2002 | Jones | |
| 6,460,656 B1 * | 10/2002 | Jones et al. | 184/13.1 |
| 6,516,789 B1 | 2/2003 | Jones | |
| 7,134,667 B2 | 11/2006 | Weiler | |
| 8,028,524 B2 | 10/2011 | Middlebrook et al. | |
| 2006/0093251 A1 * | 5/2006 | Casey et al. | 384/538 |
| 2014/0076664 A1 * | 3/2014 | Kistner et al. | 184/13.1 |

* cited by examiner

OIL SLINGER MOUNTING ARRANGEMENT

CROSS REFERENCE TO RELATED APPLICATIONS

The present application claims benefit of U.S. Provisional Patent Application No. 61/701,229 filed Sep. 14, 2012, entitled OIL SLINGER MOUNTING ARRANGEMENT, which is incorporated herein by reference.

FIELD OF THE INVENTION

The present disclosure generally relates to oil slingers, and more particularly, but not exclusively, to oil slingers mounted to a rotary shaft.

BACKGROUND

Rotor systems, such as blowers, that effectively use oil slingers remain an area of interest. Some existing systems have various shortcomings, drawbacks, and disadvantages relative to certain applications. Accordingly, there remains a need for further contributions in this area of technology.

SUMMARY

One embodiment of the present invention is a unique oil slinger. Other embodiments include apparatuses, systems, devices, hardware, methods, and combinations for an oil slinger. Further embodiments, forms, features, aspects, benefits, and advantages of the present application shall become apparent from the description and figures provided herewith.

DETAILED DESCRIPTION

Figure 1:
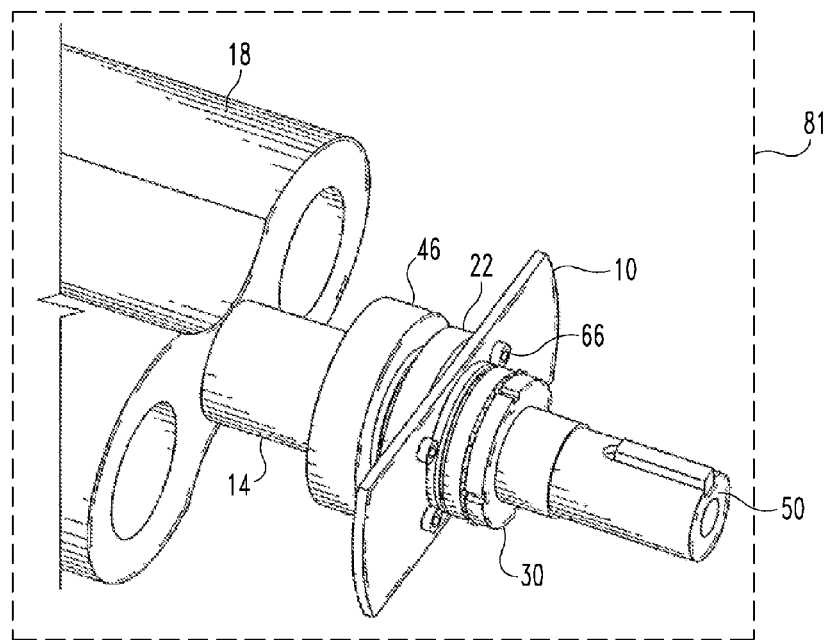
FIG. 1 is a perspective view of some aspects of a non-limiting example of an oil slinger in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
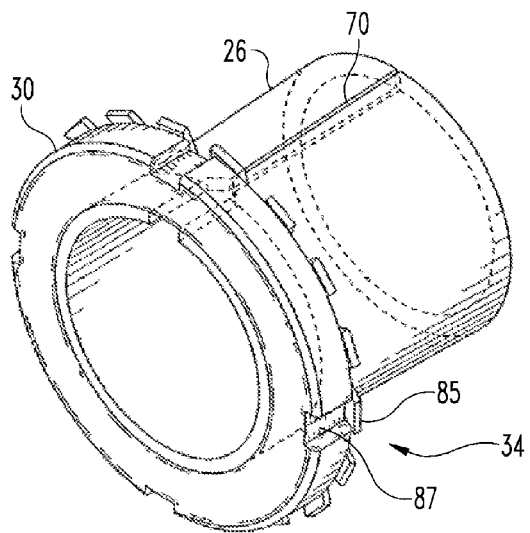
FIG. 2 is a perspective view of some aspects of a non-limiting example of an oil slinger in accordance with an embodiment of the present invention.
Figure 3:
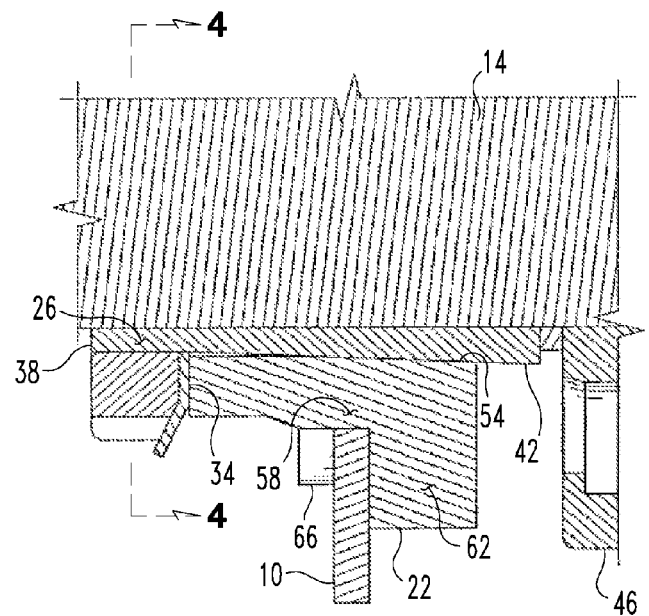
FIG. 3 is a cross-sectional view illustrating some aspects of a non-limiting example of an oil slinger in accordance with an embodiment of the present invention.
Figure 4:
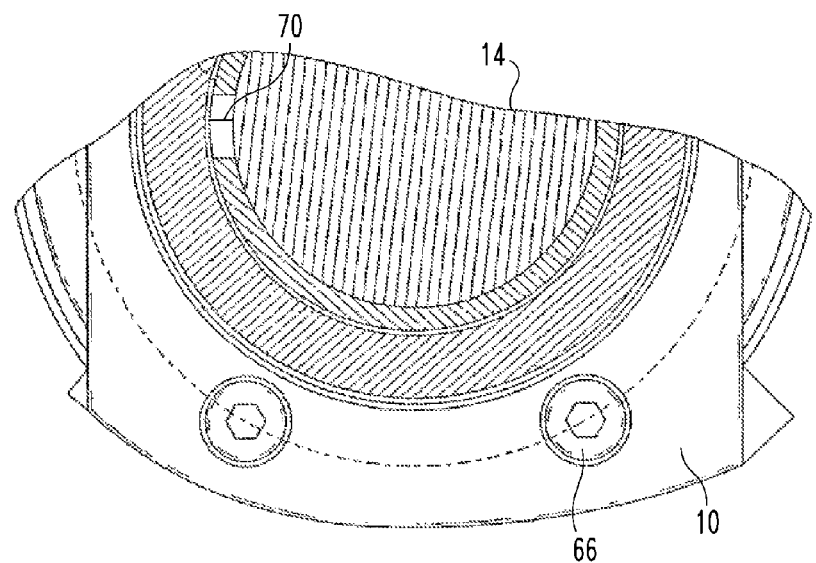
FIG. 4 is a cross-sectional view illustrating some aspects of a non-limiting example of an oil slinger in accordance with an embodiment of the present invention.

With reference to FIGS. 1-4, an oil slinger 10 attached to a rotating shaft is provided. Generally, the oil slinger 10 is mounted to a rotating shaft, and more particularly, the oil slinger 10 is mounted to the shaft 14 of a blower 81 in a removable fashion using a compression type fitting. In one embodiment, the oil slinger 10 is secured to an oil slinger hub 22 via screws, and the oil slinger hub 22 is placed onto a tapered section of a slotted adapter sleeve 26 surrounding the rotor shaft 14. A lock nut 30 and retaining element 34 are then screwed over the narrow diameter end 38 of the sleeve 26, where the slot of the sleeve is widest, to press the slinger hub 22 up the taper 42 of the sleeve 26, thereby compressing the sleeve 26 onto the shaft 14 and securing the slinger hub 22 to the sleeve 26. An advantage of this mounting arrangement is that the oil slinger 10 is less likely to become loose during use (e.g., due to thermal shifts) while still permitting disassembly for purposes of service or reuse.

One example aspect of the present disclosure provides an apparatus having a rotatably mounted shaft 14, an adapter sleeve 26, a hub 22, an oil slinger 10, a lock nut 30, and a retaining element 34. The shaft 14 may be rotatably mounted in any known fashion such as by, for example, a bearing 46. The adapter sleeve 26 is mounted about or coupled to the shaft 14 and has a tapered or frustoconical outer surface 42. A narrower end 38 of the adapter sleeve 26 is mounted toward a first end 50 of the shaft. The hub 22 is mounted about the adapter sleeve 26 and has a frustoconical inner surface 54 that mates with the frustoconical outer surface 42 of the adapter sleeve 26. The hub 22 is further provided with two sections, where a first section 58 has a radial dimension that is smaller than a radial dimension of the second section 62. The oil slinger 10, which has at least one radial dimension larger than the second section 62 of the hub, is mounted to the hub adjacent the second section 62 and about the first section 58. The oil slinger 10 is fixedly attached to the second section 62 by fasteners such as, for example, threaded fasteners such as, for example, one or more screws 66. The lock nut 30 is mounted about the adapter sleeve 26 adjacent to the first section 58 of the hub 22. A retaining element 34 may also be provided disposed between the hub 22 and the lock nut 30 (where the retaining element 34 can have a tang 85 configured to engage a slot 87 in the lock nut 30). The adapter sleeve 26 may have a slot 70 that is generally parallel to the longitudinal axis of the shaft 14 for retaining the retaining ring 34. In addition, a rotor 18 may be mounted to an end of the shaft 14.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A blower comprising:
   a housing;

a shaft rotatably mounted to said housing and having a first end and a second end and a longitudinal axis therethrough;

an adapter sleeve having a frustoconical outer surface, and being coupled to said shaft, and being disposed between said first end and said second end, with a narrower end of said adapter sleeve mounted adjacent said first end;

a hub having a frustoconical inner surface, and being coupled about said adapter sleeve, wherein said frustoconical outer surface mates with said frustoconical inner surface;

wherein said hub has a proximal section having an outer surface, a first section with an outer surface having a first radial dimension larger than a radial dimension of the outer surface of the proximal section, a second section with an outer surface having a second radial dimension that is larger than said first radial dimension, and a mounting surface that extends between the outer surface of the first section and the outer surface of the second section;

an oil slinger mounted to the mounting surface of said hub, adjacent said second section and about said first section, wherein said oil slinger is fixedly attached to said second section via one or more fasteners, and wherein the oil slinger includes a plurality of projections extending radially outward from a center of rotation and that are structured to sling oil;

a lock nut mounted about said adapter sleeve adjacent said first section; and a retaining element mounted about said adapter sleeve and disposed between said lock nut and said first section.

2. The blower of claim 1, wherein said adapter sleeve further comprises a slot parallel with said longitudinal axis for retaining said retaining element.

3. The blower of claim 2, wherein the lock nut includes a slot; and wherein the retaining element includes a tang configured to engage the slot.

4. The blower of claim 1, further comprising a rotor fixedly mounted to said second end of said shaft and housed within said housing.

5. A system comprising:
a blower;
a shaft coupled to the blower;
an adapter sleeve receivable on the shaft and having a tapered surface;
an oil slinger hub having a tapered surface configured to engage the adapter sleeve tapered surface, the oil slinger hub also including a narrow end outer surface, an intermediate middle outer surface, and a wide end outer surface, the intermediate middle outer surface including a radius larger than the narrow end outer surface and smaller than the wide end outer surface, a mounting surface extending from the intermediate middle outer surface;
an oil slinger mounted on the mounting surface, the oil slinger having an elongate projection that extends outwardly;
a lock nut mounted on the adapter sleeve; and
a retaining element.

6. The blower of claim 5, further comprising a fastener configured to secure the oil slinger to the oil slinger hub.

7. The blower of claim 5, wherein the lock nut drives the oil slinger hub up the adapter sleeve tapered surface and compresses the adapter sleeve onto the shaft and secures the oil slinger hub to the adapter sleeve.

8. The blower of claim 5, wherein the adapter sleeve has a first slot extending along the longitudinal axis of the shaft.

9. The blower of claim 8, wherein the adapter sleeve has a second slot extending only partially along the longitudinal axis of the shaft; and wherein the second slot has a greater width than the first slot.

10. The blower of claim 9, wherein the second slot is structured to retain the retaining ring.

11. The blower of claim 5, wherein the lock nut is configured to threadingly engage the adapter sleeve.

12. The blower of claim 5, wherein the lock nut includes a slot; and wherein the retaining element includes a tang configured to engage the slot.

13. The blower of claim 5, wherein the mounting surface that extends from the outer surface of the intermediate middle to the outer surface of the wide end and onto which the oil slinger is mounted faces toward the narrow end, and which further includes a fastener configured to secure the oil slinger to the oil slinger hub.

14. An apparatus comprising:
a rotatably mounted shaft having a first end and a second end and a longitudinal axis therethrough;

an adapter sleeve having a frustoconical outer surface, and being coupled to said shaft, and being disposed between said first end and said second end, with a narrower end of said adapter sleeve mounted adjacent said first end;

a hub having a frustoconical inner surface, and being coupled about said adapter sleeve, wherein said frustoconical outer surface mates with said frustoconical inner surface;

wherein said hub has a proximal section having an outer surface, a first section with an outer surface having a first radial dimension larger than a radial dimension of the outer surface of the proximal section, a second section with an outer surface having a second radial dimension that is larger than said first radial dimension, and a mounting surface that extends between the outer surface of the first section and the outer surface of the second section;

an oil slinger mounted to the mounting surface of said hub, adjacent said second section and about said first section, wherein said oil slinger is fixedly attached to said second section via one or more fasteners, and wherein the oil slinger includes a plurality of radially outwardly extending projections which are structured to sling oil;

a lock nut mounted about said adapter sleeve adjacent said first section;

a retaining element mounted about said adapter sleeve and disposed between said lock nut and said first section.

15. The apparatus of claim 14, wherein said adapter sleeve further comprises a slot parallel with said longitudinal axis for retaining said retaining element.

16. The apparatus of claim 14, further comprising a rotor fixedly mounted to said second end of said shaft.

17. The blower of claim 14, wherein the lock nut includes a slot; and wherein the retaining element includes a tang configured to engage the slot.

* * * * *